UNITED STATES PATENT OFFICE.

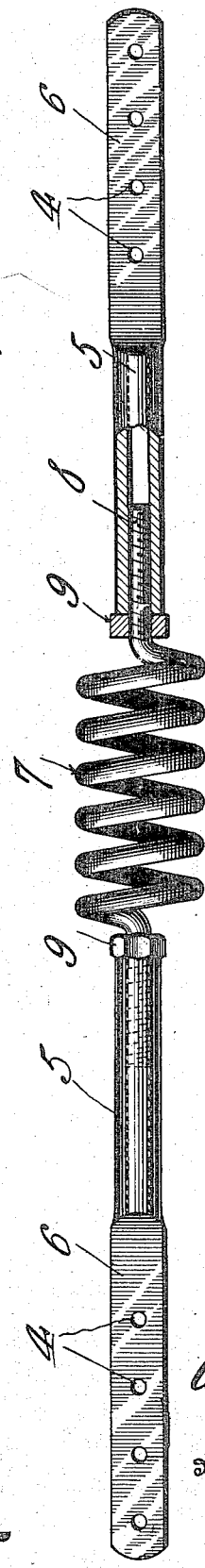

GIDEON C. SPELLINGS, OF BUENA VISTA, TENNESSEE.

PITMAN.

987,760.

Specification of Letters Patent. Patented Mar. 28, 1911.

Application filed March 24, 1909. Serial No. 485,471.

*To all whom it may concern:*

Be it known that I, GIDEON C. SPELLINGS, a citizen of the United States, residing at Buena Vista, in the county of Carroll and State of Tennessee, have invented a new and useful Pitman, of which the following is a specification.

This invention relates to that class of pitmen which are flexible or yielding in the direction of their length, as well as laterally to a limited extent, in order to prevent breakage when obstructions are encountered by the pitman, or the parts actuated thereby.

The object of the present invention is to provide an improved pitman of the kind stated which is efficient in action, and simple in construction, and also a pitman which is capable of longitudinal adjustment to adapt it for different makes of harvesting machines mowers and binders, the invention being more particularly intended to serve as a harvester pitman, although its application is not limited to that class of machinery, it being capable of use as a pump pitman, or in connection with any other class of machinery in which a pitman is employed.

With the foregoing objects in view the invention consists in a novel construction and arrangement of parts to be hereinafter described and claimed, reference being had to the drawing hereto annexed in which the invention is shown in elevation, parts being broken away.

The pitman of the present invention comprises two like members each composed of a tubular internally threaded portion 5 and a flat portion 6 provided with a plurality of orifices 4. The bores of the tubular portions are engaged by the axially alined terminals 8 of a coiled spring 7, which, as will hereinafter appear, constitutes a means for effecting longitudinal adjustments of the pitman. In order to hold the spring terminals and members against movement when the desired adjustment has been secured, nuts 9 are threaded on the terminals and are turned against the opposing ends of the members, as clearly shown in the drawing.

As is well known, mowers, binders and corn harvesters are made in standard sizes, so as to render the parts of the different machines of the same make interchangeable, but this only applies to machines of one make, as it would be by the merest chance that a part of a mower of one make could be adapted to one of another make. This is also true of the pitman rods employed on different types of machinery. Now by providing the pitman of the present invention with a series of openings at each end, and by having the spring adjustable one pitman can be used interchangeably on a binder, mower or corn harvester of the same or different makes and can be positioned readily and by a person of ordinary mechanical ability. This latter feature will be appreciated by farmers, as the loss of time and expense attending the repairing of a broken pitman will be prevented. To accentuate still further the advantages of the pitman of the present invention, suppose that a farmer is using a binder and the pitman breaks. Under ordinary conditions this would be a serious matter as if he be distant from a blacksmith considerable loss of time must ensue before repairs can be made. Now, if he be the owner of a mower equipped with the above described pitman all he will have to do will be to remove the mower pitman and adjust it to the binder and start again to work, the repairs being easily accomplished and requiring but a small loss of time.

By providing the hereindescribed adjustable flexible connection between the pitman sections, the pitman may be lengthened or shortened, and thus adapted for different makes of machines. If the parts operating the pitman, or the parts operated thereby should become jammed upon meeting obstructions, the spring 7 will expand or contract and permit the crank wheel to make a complete revolution, and by thus providing for a yielding of the pitman, there is no danger of the parts becoming broken when an obstruction is encountered. The spring 7 also permits the pitman sections to spring slightly out of alinement, thus enabling it to more effectually yield to obstructions. The threaded portions 8 are right and left handed so that upon turning the spring 7, the pitman sections will be drawn together or spread according to the direction in which the spring is turned, thus enabling the longitudinal adjustment to be readily made.

By the structure herein described a flexible and yielding pitman is had which effectually serves the purpose for which it is designed, it is simple in structure, and has no parts to catch dirt or trash when at work, which is of great importance in harvester pitmen. As already stated the pitman may be applied to pumps or any other machinery in which a pitman is employed.

What is claimed is:

A pitman for harvesters comprising two like members each composed of a tubular internally threaded portion and a flat portion provided with a plurality of orifices, the threads of the tubular portions being right and left hand, a coiled spring having its terminals right and left hand threaded and arranged in axial alinement and threaded into the tubular portions, and nuts carried by the terminals and bearing against the ends of the tubular portions to hold the members in adjusted relation, the orifices in the flat portions adapting the pitman to be used on machines of different sizes and types and the spring and the right and left hand threaded terminals serving as a means for effecting longitudinal adjustment of the pitman.

In testimony that I claim the foregoing as my own, I have hereto affixed my signature in the presence of two witnesses.

GIDEON C. SPELLINGS.

Witnesses:
 JNO. F. LOGAN,
 R. W. HALL.